Patented June 1, 1937

2,082,515

UNITED STATES PATENT OFFICE 2,082,515

DRYING OIL PRODUCT AND PROCESS OF MAKING SAME

Frank Brian Root, Caldwell, N. J.

No Drawing. Application April 13, 1934, Serial No. 720,441

9 Claims. (Cl. 134—26)

This invention relates to methylene-modified vegetable oils, as exemplified by the reaction product of a drying oil such as tung oil and formaldehyde, the modified oil product being considered as an intermediate for combination with other materials as set forth below.

Among the objects of this invention is to produce a modified vegetable oil of such properties that it can be incorporated with aldehyde-condensation products such as phenol-aldehyde, ketone-formaldehyde, and the like. Also, to produce a modified oil which can be combined with those compounds which show condensative reactibility with aldehydes, such as phenols, acetone, aniline, sulphonamides, and the like, or mixtures of these.

Vegetable oils other than tung oil can be used, as shown in the examples below. However, under the reaction conditions described, tung oil seems to show somewhat greater reactivity. Therefore, transformations of the aldehyde compound are illustrated for the tung oil product, which is designated tung oil-formaldehyde. The oils may be raw oils, or blown or partially polymerized oils. Aldehydes which may be used include formaldehyde and its polymers, acetaldehyde, benzaldehyde, furfural and the like.

*Example 1.*—10 parts of tung oil and 1 part of paraformaldehyde were heated under pressure at 145–150° C. The paraform slowly disappeared and after about 8 hours at this temperature the oil was clear. If a temperature of 135–140° C. is used, about 15 hours are required in order to yield a clear oil.

*Example 2.*—Tung oil acids (obtained by hydrolysis of tung oil) were treated with paraform under the same conditions as in Example 1. Combination occurred in a shorter time; that is, about 4 to 5 hours at 145–150° C., and 8 to 10 hours at 135–140° C.

*Example 3.*—Linseed oil was heated with 10 per cent of paraform. This combination required about 5 hours at 145–150° C., and about 12 hours at 135–140° C. The product was a clear light-colored oil.

The fatty acids obtained from linseed or castor oils show a less degree of reactivity toward paraformaldehyde than do the oils themselves. With tung oil the opposite is true.

The reaction of vegetable oils and formaldehyde can be hastened by addition of condensing catalysts. When an anhydrous aldehyde is being condensed it is preferable to use a mild agent such as an organic acid. In this way, the reaction product is not unduly darkened in color and polymerization is reduced. However, when the reaction mixture contains aqueous formaldehyde, a stronger catalyst can be used, such as a mineral acid.

*Example 4.*—10 parts of tung oil, 1 part of paraformaldehyde and 5 per cent of formic acid were heated under pressure. Combination, as indicated by disappearance of paraform, occurred in 6 to 7 hours at 145–150° C., or in 9 to 12 hours at 135–140° C. The oil darkened slightly in this treatment but a lighter color can be obtained by using glacial acetic acid in place of formic acid.

*Example 5.*—100 parts of tung oil, 25 parts of 40 per cent aqueous formaldehyde solution and 10 parts sulphuric acid were heated under a reflux condenser. A slow stream of air was bubbled through the mixture as it was being heated. After heating for 7 hours, the aqueous layer was withdrawn and the oil was washed with dilute soda solution to neutralize the condensing agent and finally washed with water. The oil can be dehydrated by allowing it to stand; or, it can be heated to about 120° C. in order to drive off the water.

The reaction product of tung oil and formaldehyde usually is a fluid oil of lighter color than the original oil. The modified oil exhibits substantially the drying characteristics of raw tung oil; that is, it dries rapidly to produce a frosted surface. When heated above about 130° C., some formaldehyde is given off. The dissociation temperature varies somewhat with the aldehyde products from different oils; for example, the compound from linseed fatty acids begins to dissociate at about 120° C. Tung oil-formaldehyde is soluble in mineral spirits, benzene, toluene, turpentine, ethyl acetate, and acetone; it is insoluble in methyl and ethyl alcohols. The oil is miscible with the usual varnish resins and can be used in oil varnishes.

The following examples show further properties of tung oil-aldehyde particularly its compatibility with aldehyde-reactive compounds and condensation products.

*Example 6.*—A mixture of 100 parts of tung oil-formaldehyde and 20 parts phenol was heated at 120° C. The phenol dissolved readily and a slight amount of foaming occurred. The oil slowly thickened to a pale yellow, viscous liquid. This can be thinned with mineral spirits and drier solution added to produce a varnish. Other phenols can be used in place of phenol itself; for example, cresols, xylenols, and higher homologues or mixtures of these.

*Example 7.*—A phenol-formaldehyde resin was made by heating under a reflux condenser equal weights of phenol and 40% aqueous formaldehyde, with 1 per cent of concentrated hydrochloric acid. When a distinct water layer had formed, the lower layer was drawn off and dehydrated by heating to 120° C. 10 parts of this resin were heated with 20 parts of tung oil-formaldehyde. The resin mixed readily with the oil to form (after heating to 200° C.) a light-colored, viscous mass. This varnish base can be thinned with mineral spirits to form a varnish which, after driers (e. g., solutions of metallic naphthenates) have been added, air-dries to a glossy, flexible film. The varnish can be hardened more rapidly by baking, and can be used in such applications as the coating of the interior of tin cans or as surfacing or impregnating material for fabrics.

Miscibility of tung oil-formaldehyde with phenol-formaldehyde resins indicates the extent of modification of the oil brought about by reaction with formaldehyde, since formaldehyde resins of phenol ($C_6H_5OH$) are known to be insoluble in raw tung oil. The ready miscibility of tung oil-formaldehyde with aldehyde resins denotes applicability of the oil as a plasticizer for use in hot-molded articles.

The procedure can be varied by reacting the oil with a greater amount of formaldehyde than called for in Example 1. Any unreacted aldehyde is then combined by adding a phenol or other aldehyde-reactive compound. In this way harder composite products can be obtained.

*Example 8.*—100 parts of tung oil, 100 parts 40 per cent aqueous formaldehyde solution and 0.5 per cent of concentrated hydrochloric acid were refluxed for 5 hours. Then 94 parts of phenol were added and refluxing was continued until an upper water layer appeared. This was poured off and the resin was dehydrated by heating it to about 120° C. A condensing agent can be dispensed with but in this case the primary condensation must be prolonged (say for 15 hours).

Although broadly the invention comprises the modification of a vegetable oil, particularly a drying oil, by treatment with an aldehyde, specifically formaldehyde or related isomers, the preferred embodiment and the intended immediate use for the invention concerns the aldehydration (that is, reaction between the oil and an aldehyde) of tung oil, especially to prepare what may be termed a tung-formaldehyde body.

The latter exhibits a desirable and important solvent action on those phenol-formaldehyde resins which ordinarily will not by themselves dissolve in tung oil. Many efforts have been put forth to obtain varnishes from drying oils incorporated with phenol-formaldehyde resins. These usually contemplate 1. The use of a substantial proportion of rosin which permits adequate solubility of the phenolic resin.

2. Instead of the simple phenols, substituted, condensed, or higher phenols are employed, such as amyl phenol.

The presence of rosin in substantial proportion is undesirable as it tends to lessen the exposure life of a coating.

The specially prepared phenols, such as amyl phenol, are so costly that the expense of making a varnish from these is unduly high.

By my invention the tung oil or other drying oil is modified so that it is capable of exerting a solvent action on resins made cheaply from formaldehyde and simple phenols of relatively low cost and without the need of incorporating a considerable proportion of rosin. By simple phenols I refer especially to ordinary phenol, $C_6H_5OH$, and its immediate homologues, the cresols and xylenols or mixtures of any of these simple phenols. Since such simple phenols are readily obtained from coal tar, their cost is much less than the specially prepared phenols such, for example, as amyl phenol, which is made by reacting amylene with phenol in the presence of aluminum chloride, a relatively costly step.

Thus there may be obtained by the present invention a reaction product of tung oil and formaldehyde carrying in solution a substantial proportion of a simple phenol-formaldehyde resin which would ordinarily be insoluble in normal tung oil.

The invention therefore contemplates the production of varnishes, enamels, paint vehicles, and the like, by the step of dissolving a simple phenol resin in a drying oil, such as tung oil, without an auxiliary solvent resin, such as ordinary rosin, and further without resorting to the employment of complex synthetic phenols, such as amyl phenol, condensed phenols, and the like.

What I claim is:

1. The process of making a drying oil product consisting in heating under reaction conditions a mixture consisting essentially of the two components: a glyceride drying oil and formaldehyde.

2. The process of making a drying oil product consisting in heating under reaction conditions a mixture consisting essentially of the two components: tung oil and formaldehyde.

3. The reaction product of a mixture consisting essentially of the two components: a glyceride drying oil and formaldehyde.

4. The reaction product of a mixture consisting essentially of the two components: tung oil and formaldehyde.

5. The reaction product of a mixture consisting essentially of the two components: linseed oil and formaldehyde.

6. The product of claim 3 containing dissolved therein a simple phenol-aldehyde resin normally insoluble in a glyceride drying oil.

7. The product of claim 4 containing dissolved therein a simple phenol-aldehyde resin normally insoluble in tung oil.

8. The process of making a phenol resin varnish base consisting in heating a drying oil and formaldehyde at reaction temperature and dissolving in the formaldehyde-drying oil product thus formed a simple phenol-aldehyde resin normally insoluble in a drying oil.

9. The process of making a phenol resin varnish base consisting in heating tung oil and formaldehyde at reaction temperature and dissolving in the formaldehyde-drying oil product thus formed a simple phenol-formaldehyde resin normally insoluble in tung oil.

FRANK BRIAN ROOT.